United States Patent [19]

Murakami et al.

[11] Patent Number: 5,424,121
[45] Date of Patent: Jun. 13, 1995

[54] BIAXIALLY ORIENTED POLYESTER FILM

[75] Inventors: Takashi Murakami; Tetsuo Ichihashi, both of Matsuyama; Kinji Hasegawa, Hachioji, all of Japan

[73] Assignee: Teijin Limited, Osaka, Japan

[21] Appl. No.: 73,670

[22] Filed: Jun. 8, 1993

[30] Foreign Application Priority Data

Sep. 6, 1992 [JP] Japan .................................. 4-149480
Oct. 6, 1992 [JP] Japan .................................. 4-150610
Oct. 6, 1992 [JP] Japan .................................. 4-150611

[51] Int. Cl.$^6$ ...................... B32B 27/36; B32B 15/08; C08G 63/16
[52] U.S. Cl. .................................... 428/337; 428/339; 428/458; 428/480; 428/910; 528/281; 528/283; 528/308.5
[58] Field of Search ............... 428/458, 480, 910, 337, 428/339; 528/281, 283, 308.5

[56] References Cited

U.S. PATENT DOCUMENTS 3,635,900  1/1972  Price et al. .................. 260/75 R
4,362,775  12/1982  Yabe et al. .................... 428/213

FOREIGN PATENT DOCUMENTS 0312616  4/1989  European Pat. Off. .
0415383  3/1991  European Pat. Off. .
0474240  3/1992  European Pat. Off. .
49-007356  1/1974  Japan .
2238507  6/1991  United Kingdom .

Primary Examiner—P. C. Sluby
Attorney, Agent, or Firm—Sherman and Shalloway

[57] ABSTRACT

A biaxially oriented polyester film which is characterized as follows: (A) it is composed of an aromatic co-polyester which is obtained with use of a germanium compound as the polycondensation catalyst, the co-polyester having a melting point in the range from 210° to 245° C. and a glass transition temperature not lower than 50° C., (B) it has a refractive index in the thickness direction in the range from 1.505 to 1.55 and a refractive index in the plane direction in the range from 1.61 to 1.66, and (C) it exhibits excellent shaping processability when it is laminated onto a metal sheet and subjected to deep drawing. This film exhibits excellent shaping processability, heat resistance, resistance to embrittlement under retort treatment, and flavor retention and is useful for coating inner and outer surfaces of metal cans such as those containing beverage or food.

28 Claims, No Drawings

BIAXIALLY ORIENTED POLYESTER FILM

DETAILED EXPLANATION OF THE INVENTION

This invention relates to a biaxially oriented polyester film. More specifically, the invention relates to a biaxially oriented polyester film which exhibits excellent shaping processability, heat resistance, resistance to embrittlement under retort treatment, and flavor retention and which is useful for coating inner and outer surfaces of metal cans such as those containing beverage or food.

Inner and outer surfaces of metal cans are generally coated to be protected from corrosion. Recently, there have been developed methods for imparting rustproof property to metal cans without using paints or organic solvents for the purpose of simplification of manufacturing steps, improvement in sanitary condition and prevention of environmental pollution. As one of such methods, coating of metal cans with thermoplastic resin film has been attempted. More specifically, methods of laminating a metal sheet of, for example, tinplate, tin-free steel or aluminium, with a thermoplastic resin film and then making cans therefrom by deep draw processing or the like are under investigation. As the thermoplastic resin film, use of polyolefin film or polyamide film was tried, but a film satisfying all of the required properties such as shaping processability, heat resistance and flavor retention has not yet been obtained.

On the other hand, a polyester film, in particular, a polyethylene terephthalate film, is drawing attention because of its well-balanced properties, and a number of proposals have been made using the polyester film as the base film.

Japanese Laid-open Patent Publication No. 10,451/1981 discloses a resin-coated metal sheet for containers, which comprises a metal sheet coated with a biaxially oriented polyester film, through a polyester adhesive layer composed of 5 to 80 wt. % of high-melting polyester having a melting point of not lower than 200° C. and 20 to 95 wt. % of a low-melting polyester having a melting point of not lower than 100° C. but lower than that of the high-melting polyester by 5° C.

Japanese Laid-open Patent Publication No. 192,546/1989 discloses a laminated steel plate having a two-layer coated structure, which is composed of an upper surface layer of a biaxially oriented polyethylene terephthalate resin, an under layer thereof of an unoriented polyester resin having a melting point lower than a thermosetting temperature of said biaxially oriented polyethylene terephthalate resin by 10° to 40° C., and a steel sheet.

In laminated metal sheets disclosed in above Japanese Laid-open Patent Publications Nos. 10,451/1981 and 192,546/1989, a biaxially oriented polyester film such as the biaxially oriented polyethylene terephthalate film exhibits excellent heat resistance and flavor retention. However, a problem remains to be solved that the film develops opacity (formation of fine cracks) or breakage during can-making processing which entails large deformation, because of insufficient shaping processability of the film.

Japanese Laid-open Patent Publication No. 192,545/1989 discloses a thin steel sheet with one of its surfaces coated with tin-plating film and the other surface, with chromium film or with the tin-plating film and chromium film applied thereon as the surface layer; and a laminated steel sheet for cans excelling in processability and corrosion resistance, which has, on the chromium coating on said thin steel sheet, an amorphous polyester resin coating having a melting point of 200° to 240° C. and a thickness of 10 to 100 μm.

Japanese Laid-open Patent Publication No. 57,339/1990 proposes, as a polyester film serving as internal lining of metal cans, a polyester films formed of a dicarboxylic acid component consisting of 50 to 95 mol % of terephthalic acid and 50 to 5 mol % of isophthalic acid and/or orthophthalic acid and a glycol component having 2 to 5 carbon atoms, said film having a specific gravity, as measured by Micro-Raman method after a heat treatment for 2 minutes at 210° C., of not more than 1.350.

Because the starting polyester for the polyester films in the products disclosed in Japanese Laid-open Patent Publications Nos. 192,545/1989 and 57,339/1990 is amorphous or of very low crystallinity, the films exhibit good shaping processability. However, they are inferior in flavor retention and are apt to become brittle during the post treatments such as printing, retort sterilizing after the can-making or during prolonged storage, and degenerate to readily produce cracks by externally exerted impact.

Japanese Laid-open Patent Publication No. 22,530/1989 discloses a polyester film to be laminated onto metal, which has a density of at least 1.385 and a planar orientation coefficient $fp$ of at least 0.130 but less than 0.160, said coefficient being expressed by the following equation:

$$fp = (n_1 + n_2)/2 - n_3$$

wherein $n_1$ = refractive index in the longitudinal direction; $n_2$ = refractive index in the transverse direction; and $n_3$ = refractive index in the thickness direction.

This polyester film to be laminated onto metal has not yet attained the low degree of orientation suitable for the can-making processing. Even when it could be processed within a range in which deformation is small, the film is liable to become brittle during subsequent printing and other retort treatments for sterilization and is likely to degenerate into a film that is readily cracked by externally exerted impact.

European Patent Publication No. 0415383A2 discloses a biaxially oriented polyester film for laminating a metal plate or forming a vessel comprising a copolyester which contains a lubricant having an average particle diameter of not greater than 2.5 μm and has a melting point of from 210° to 245° C. The film has a plane orientation coefficient of from 0.10 to 0.16, a thermal shrinkage at 150° C. of no higher than 10%, a density of lower than 1.385 g/cm³, a refractive index in a direction of thickness of from 1.495 to 1.530, and a film plane refractive index of from 1.61 to 1.66 in all directions.

European Patent Publication No. 0474240A2 discloses a polyester film for metal sheet lamination drawing and processing which comprises a co-polyester containing a lubricant having an average particle diameter of 2.5 μm or less the co-polyester having a melting point of 210° to 245° C. The refractive index in the direction of the film thickness is 1.505 to 1.550, the refractive index in the direction of the film plane is 1.61 to 1.66 about all directions, and subpeak by DSC is 150° to 205° C.

An object of the present invention is to provide a biaxially oriented polyester film.

Another object of the present invention is to provide a biaxially oriented polyester film which exhibits excellent shaping processability, heat resistance, resistance to embrittlement under retort treatment and flavor retention.

A further object of the present invention is to provide a biaxially oriented polyester film which exhibits excellent shaping processability when laminated onto a metal sheet and made into cans by such treatment as draw processing, and is capable of providing metal cans excelling in heat resistance, resistance to embrittlement under retort treatment and flavor retention, for example, cans for beverage or food.

Still another object of the present invention is to provide a use of the biaxially oriented polyester film of the present invention as a film to be laminated onto metal sheet.

Other objects and advantages of the present invention will become apparent from the following descriptions.

According to the present invention, the above objects and advantages are achieved with a biaxially oriented polyester film which is characterized in that (A) it is composed of an aromatic copolyester which is obtained with use of a germanium compound as the polycondensation catalyst, said copolyester having a melting point in the range from 210° to 245° C. and a glass transition temperature not lower than 50° C., (B) it has a refractive index in the thickness direction in the range from 1.505 to 1.55 and that in the plane direction in the range from 1.61 to 1.66, and (C) it exhibits excellent shaping processability when it is laminated on metal sheet and subjected to deep drawing.

The aromatic copolyester (A) to constitute the biaxially oriented polyester film of the present invention is a polymer that is obtained by polycondensation using a germanium compound as the catalyst. For example, those having terephthalic acid as the main acid component and ethylene glycol as the main glycol component are used with preference.

As the subsidiary acid component, aliphatic dicarboxylic acids such as adipic, azelaic, sebacic and decanedicarboxylic acids; and aromatic dicarboxylic acids such as isophthalic, phthalic, 2,6-naphthalenedicarboxylic, 2,7-naphthalenedicarboxylic and 1,5-naphthalenedicarboxylic acids are preferred. Preferred examples of the subsidiary glycol component include aliphatic diols such as diethylene glycol, propylene glycol, neopentyl glycol, butanediol, pentanediol and hexanediol; and polyalkylene glycols such as polyethylene glycol and polypropylene glycol. These can be used either singly or in combination.

As the aromatic copolyester, a polyester which comprises ethylene terephthalate as the main recurring units and ethylene isophthalate as the subsidiary recurring units is particularly preferred.

The aromatic copolyester (A) used in the present invention, furthermore, has a melting point in the range from 210° to 245° C. and a glass transition temperature not lower than 50° C.

When a melting point of the copolyester is lower than 210° C., the film cannot withstand the heating in a printing process after the coated metal sheet is formed into cans, because of the inferior heat resistance. On the other hand, when it exceeds 245° C., crystallinity of the polymer is too high and consequently, its shaping processability is impaired. Further, when the copolyester has glass transition temperature lower than 50° C., there occur problems that the film strength is reduced by the heat treatment (boiling water treatment or the like) of the metal sheet after shaping and, when the film is laminated onto the metal sheet and processed into cans, the product cans come to exhibit inferior flavor retention of canned contents.

The aromatic copolyester preferably has a melting point in the range from 215° to 240° C., and a glass transition temperature preferably not lower than 60° C.

The aromatic copolyester can be prepared by either direct esterification or ester-interchange method. When an ester-interchange method is employed, preferably a manganese compound or titanium compound is used as the ester-interchange catalyst. As the manganese compound, for example, manganese acetate is preferred. Preferred titanium compounds include, for example, a reaction product of alkyl titanate and/or condensate thereof with an organic carboxylic acid and/or acid anhydride thereof, and titanium acetate. In particular, above reaction product is preferred.

In the polycondensation stage, furthermore, a germanium compound is used as the polycondensation catalyst. As the germanium compound, preferred are, for example, (a) amorphous germanium oxide, (b) fine crystalline germanium oxide, (c) a solution prepared by dissolving germanium oxide in glycol in the presence of alkali metal, alkaline earth metal or their compounds, and (d) an aqueous solution of germanium oxide. As the germanium oxide, any of GeO, $GeO_2$ and $GeO_2 \cdot H_2O$ can be used.

The amount of such germanium compound is from 40 to 200 ppm, preferably 60 to 150 ppm, in terms of the germanium atom remaining in the aromatic copolyester.

The aromatic copolyester used in the present invention preferably has a terminal carboxyl group concentration of at least 35 eq./$10^6$ g, more preferably at least 40 eq./$10^6$ g, inter alia, at least 50 eq./$10^6$ g. It is our novel discovery that the terminal carboxyl group concentration is intimately related to flavor retention of the product film. The terminal carboxyl group concentration significantly affects also adhesive property of the film to metal sheet. When the concentration exceeds 80 eq./$10^6$ g, however, thermal decomposition of the polyester markedly progresses, film-forming operation is apt to become unstable, and foreign matters causing degradation are apt to mix into the product. Hence, such a high terminal carboxyl group concentration is objectionable.

The terminal carboxyl group concentration of at least 35 eq./$10^6$ g is higher than that in ordinary polyester. The reason why excellent flavor retention or adhesion to metal sheet is observed at the above value has not yet been fully clarified, but presumably the phenomena are attributable to reduction in adsorption due to certain interaction between terminal carboxyl groups and flavor component and improvement in affinity to metal sheet due to the terminal carboxyl groups.

The copolyesters having such terminal carboxyl group concentration can be prepared by the ester-interchange or esterification method under the following specific reaction conditions, i.e., for example, (1) a metal compound, e.g., Mg, Mn, Zn, Ca, Li or Ti compound, to be used at the time of ester-interchange reaction or esterification is used in a greater amount than that of normal use, to obtain the polyester; (2) at the advanced stage of the polymerization reaction, the system is maintained at higher temperature and/or longer time than the normally employed temperature and/or time, or (3) a monomer relatively susceptible to thermal decomposition, for example, an aliphatic carboxylic acid or aliphatic glycol having 4 to 12 carbon atoms, is copolymerized. It is also possible to blend a fixed amount of "regenerated" polymer, whose thermal decomposition has relatively advanced, into the copolyester to provide a copolyester of the present invention having the specified terminal carboxyl group concentration.

The aromatic copolyester (A) to be used in the present invention preferably has an acetaldehyde content of not higher than 20 ppm, more preferably not higher than 10 ppm, inter alia, not higher than 5 ppm. When the acetaldehyde content exceeds 20 ppm, the acetaldehyde is eluted into the contents of the metal cans prepared with the use of the copolyester film to invite degradation in flavor retention. Since aromatic copolyester normally contains more than 100 ppm of acetaldehyde at the termination of the polycondensation reaction, it is necessary to reduce the acetaldehyde content to a low value not exceeding 20 ppm, for example, by the following means:

(1) the copolyester chips are heat-treated over a prolonged period at temperatures in the order of 150° to 200° C. to sufficiently volatilize off acetaldehyde, and thereafter the chips are melt-extruded within a short time to provide a film;

(2) at the time of stretching and heat-treating the unstretched film obtained by melt-extrusion, acetaldehyde is volatilized off by blowing a large volume of hot air.

The aromatic copolyester (A) to be used in the present invention preferably has a terminal methyl group concentration of not higher than 15 eq./$10^6$ g, more preferably not higher than 10 eq./$10^6$ g.

When the terminal methyl group concentration of the aromatic copolyester is high, white powder is apt to be formed of the copolyester during the shaping processing, and when metal cans are made using the above copolyester film, a tendency to inferior flavor retention is observed.

The aromatic copolyester (A) to be used in the present invention preferably has intrinsic viscosity in a range from 0.52 to 0.80, more preferably from 0.54 to 0.70, inter alia, from 0.57 to 0.65.

When the intrinsic viscosity is less than 0.52, the film tends to become brittle during a retort treatment for sterilization after the metal cans are filled, or during the subsequent storage over a prolonged period, and easily cracks by externally exerted impact, even when other properties are favorable and lamination of the film to metal sheet and can-making thereof by deep drawing are satisfactorily conducted. On the other hand, aromatic copolyesters having intrinsic viscosity exceeding 0.80 are of excess quality and hence, productivity of the starting polymers decreases. Therefore, use of such copolyesters is uneconomical.

The aromatic copolyester used in the present invention preferably contains inert fine particles. The inert fine particles preferably have a particle diameter ratio of the longer diameter/shorter diameter in a range from 1.0 to 1.2. It is furthermore preferred that the inert fine particles have an average particle diameter of not more than 2.5 μm. The fine particles may be either inorganic or organic, while inorganic particles are preferred. Examples of the inorganic particles include silica, alumina, titanium dioxide, calcium carbonate and barium sulfate. Examples of organic fine particles include silicone particles.

Particularly preferred fine particles in respect of resistance to pin hole forming are monodispersed fine particles having an average diameter of not more than 2.5 μm and a particle diameter ratio (the longer diameter/shorter diameter) of 1.0 to 1.2. Examples of such fine particles include truly spherical silica, truly spherical silicone and truly spherical calcium carbonate.

The amount of the fine particles to be contained in the copolyester can be conveniently determined by ease of taking up into a roll in the film-forming step. When the particles are of larger size within the specified range, normally it is preferred to add a small amount, while addition of a large amount is preferred when the particles are of smaller size. For example, silica of an average particle diameter of 2.0 μm is preferably added in an amount of about 0.05 wt %, while the preferred amount is about 0.3 wt % for titanium dioxide having an average particle diameter of 0.3 μm. It is also possible to opacify the film by intentionally using an excessive amount of such inert fine particles. For example, a white film can be obtained by adding 10 to 15 wt% of titanium dioxide.

Furthermore, the inert fine particles are not necessarily limited to those externally supplied. For example, internally precipitated particles may also be used, which are formed by precipitating, during the reaction step, part or the whole of, for example, a catalyst used for the polyester preparation. Such internally precipitated particles may be concurrently used with externally added particles.

The biaxially oriented polyester film of the present invention has a refractive index in the thickness direction in a range from 1.505 to 1.55, and that in the plane direction, in a range from 1.61 to 1.66.

When the refractive index in the thickness direction is less than 1.505, shaping processability of the film is unsatisfactory, while when it exceeds 1.55 (i.e., when it has an excessively low orientation), the film is of the structure close to amorphous state and consequently, exhibits insufficient heat resistance.

Preferred refractive index in thickness direction of the film is In a range from 1.51 to 1.54.

The refractive index in thickness direction of the film is measured as follows.

A polarizing plate analyzer is mounted to the ocular side of Abbe refractometer, and refractive index is measured using monochromatic light, NaD ray. Methylene iodide is used as the mounting liquid, and the measuring temperature is 25° C.

When the refractive index in the plane direction of the film deviates from the range of 1.61 to 1.66, anisotropy of the film becomes conspicuous and shaping processability of the film is impaired. The refractive index in the plane direction of the film is also measured, like in the case of measuring the refractive index in the thickness direction, using Abbe refractometer.

Preferred range of the refractive index in plane direction of the film is from 1.615 to 1.655.

The biaxially oriented polyester film of the present invention preferably has an endothermic peak other than at its melting point in a range of 150° to 205° C., as measured with Differential Scanning Calorimeter (DSC).

The biaxially oriented polyester film of the present invention, furthermore, preferably has fine projections on the film surface, said fine projections satisfying the following equation:

$$0.1 \leq Nd/N \leq 0.5$$

in which N is the number of fine projections per the unit area, and Nd is the number of such projections that have depressions therearound, among said fine projections (N).

The less the content of low molecular weight compounds in the biaxially oriented polyester film of the present invention, the more preferred. For example, when the film is subjected to a heat-treatment in n-heptane at 66° C. for 2 hours, the amount of the resulting extract preferably is 0.5 mg/inch$^2$ or less, more preferably 0.1 mg/inch$^2$ or less.

The biaxially oriented polyester film of this invention preferably has a thickness of 6 to 75 $\mu$m, more preferably 10 to 75 $\mu$m, inter alia, 15 to 50 $\mu$m. When the thickness is less than 6 $\mu$m, the film is apt to break during processing, while the film thicker than 75 $\mu$m is of excess quality and hence, is uneconomical.

Another characteristic feature of the biaxially oriented polyester film of this invention is that it exhibits excellent shaping processability when it is laminated onto metal sheet and subjected to deep drawing. More concretely, "a film having excellent shaping processability" stands for such a film that exhibits, for example the deep drawing ability-(2), which will be explained later, of 0.1 mA or less when the film is laminated onto metal sheet and subjected to deep drawing.

The biaxially oriented polyester film of the present invention can be obtained by the process known per se which comprises melting the heretofore described aromatic copolyester, discharging the melt through a die to form it into film, biaxially stretching the film and heat-setting the same.

The biaxially oriented polyester film of the present invention is conveniently used, in particular, as a film to be laminated onto metal sheet, for example, as a film to be laminated onto metal sheet and subjected to deep drawing to form metal cans.

As the suitable metal sheet, those of tinplate, tin-free steel and aluminium may be used, for example. Lamination of the polyester film onto metal sheet can be effected by, for example, the following methods (1) or (2).

(1) A metal sheet is heated to a temperature higher than the melting point of the film, and after it is laminated onto the film, rapidly cooled to make the surface portion (thin layer portion) of the film in contact with the metal sheet amorphous, to effect intimate adhesion.

(2) An adhesive layer is applied onto the film in advance as a primer coat, and the coated surface is laminated onto a metal sheet. As such an adhesive layer, known resin adhesive layer, for example, that of epoxy-type adhesive, epoxy-ester type adhesive or alkyl-type adhesive can be used.

Hereinafter the present invention is further explained with reference to working Examples, in which part is by weight. The property values indicated in those Examples were measured by the following method:

(1) Intrinsic viscosity:
Measured for each sample as dissolved in ortho-chlorophenol at 35° C.

(2) Melting point and glass transition temperature:
Using Du Pont Instruments 910 DSC, the melting peak and glass transition temperature peak of each sample were determined at a temperature rise rate of 20° C./min. The amount of a sample for measurement was about 20 mg.

(3) Terminal carboxyl group concentration:
Measured according to the method of A. Conix Makromol. Chem. 26, 226 (1958)]

(4) Acetaldehyde content:
The amount of acetaldehyde formed at the time when a sample film was heat-treated at 160° C. for 20 minutes was determined by means of gas chromatograph.

(5) Terminal methyl group concentration:
Sample copolyester was hydrolyzed to separate the acid component from the glycol component, and methyl ester component of the acid was determined by means of gas chromatograph. The concentration is calculated from the so determined value.

(6) Deep-drawing ability-1:
The processability was evaluated according to the following three-grade system.
A: Sample film could be deep-draw processed on both inner and outer surfaces of a metal can with no abnormality, and the film on said surfaces showed no opacification or breakage.
B: Opacification of the film is observed at upper portion of the metal can.
C: Breakage was observed in some portions of the film.

(7) Deep-drawing ability-2:
The processability was evaluated according to the following two-grade system.
A: Sample film could be deep-draw processed on both inner and outer surfaces of a metal can with no abnormality, and when the film-coated surface was subjected to a rust-proof test (hereinafter referred to as ERV test) (1% NaCl aqueous solution was charged in the can, an electrode was inserted therein to make the can body an anode, and when a voltage of 6 V was applied, an electric current value was measured) the current value was 0.2 mA or less.
B: The film showed no abnormality, but the measured current value in the ERV test was 0.2 mA or less in ERV test, and when the part through which the electric current was passed was magnified for observation, pinhole-like cracks starting at coarse lubricant particles were observed in the sample film.

(8) Resistance to crackby impact:
Excellently deep-draw processed cans were filled with water to full, and each group consisting of ten water-filled cans was dropped from a height of 1 m on a polyvinyl chloride tiled floor. Thereafter the cans were subjected to the ERV test. The results were evaluated in three-grade system as follows.
A: All ten cans showed the current value of 0.1 mA or less.
B: Five (5) to 9 cans showed the current value of 0.1 mA or less.
C: Either 4 or less cans showed the current value of 0.1 mA or less, or cracks in the film were already observed after the dropping.

(9) Resistance to embrittlement under heat:
Excellent deep-draw processed cans were heated at 210° C. for 5 minutes, and thereafter evaluated for their resistance to crack by impact in the same manner as described in (8) above.
A: All ten cans showed the current value of 0.1 mA or less.

B: Five (5) to 9 cans showed the current value of 0.1 mA or less.

C: Either 4 or less cans showed the current value of 0.1 mA or less, or cracks in the film were already observed after the heating at 210° C. for 5 minutes.

(10) Resistance to embrittlement under retort treatment (retort resistance):

Excellently deep-draw processed cans were filled with water to full, subjected to a retort treatment at 130° C. for an hour in a steam sterilizer, and thereafter kept at 50° C. for 30 days. Each group consisting ten of such cans was then dropped from a height of 1 m on a polyvinyl chloride tiled floor, and subjected to the ERV test.

A: All ten cans showed the current value of 0.1 mA or less.

B: Five (5) to 9 cans showed the current value of 0.1 mA or less.

C: Either 4 or less cans showed the current value of 0.1 mA or less, or cracks in the film were already observed after the dropping.

(11) Rustproof property:

Excellently deep-draw processed cans were filled with 5% aqueous solution of acetic acid to full, left standing at 50° C. for 7 days and rusting of the metal sheet was evaluated.

A: No rust observed on any of ten cans.

B: Rust observed on 1 to 5 cans.

C: Rust observed on 6 or more cans.

(12) Flavor retention:

Ten (10) per group of excellently deep-draw processed cans were filled with a soda pop or mineral water and sealed airtight. After storage at 87° C. for 4 months, the cans were opened and deterioration in flavor of their contents was sensuously evaluated by ten panelists.

A: All panelists sensed no change in flavor.

B: One (1) to 2 panelists sensed delicate change has occurred in flavor.

C: Five (5) to 6 panelists sensed appreciable change in flavor.

D: All ten panelists sensed change in flavor.

EXAMPLES 1 TO 3 AND COMPARATIVE EXAMPLES 1 AND 2

Ninety (90) parts of dimethyl terephthalate, 10 parts of dimethyl isophthalate and 70 parts of ethylene glycol were charged in an autoclave. Furthermore, 0.037 part of manganese acetate tetrahydrate was added and the ester-interchange reaction was conducted in a conventional manner. Then, after addition of 0.013 part of phosphoric acid, 0.027 part of germanium dioxide was added. The atmosphere of the reaction system was reduced to vacuum, and polycondensation was conducted in a conventional manner, to provide a copolyester.

The copolyester so obtained was extruded through a die, rapidly cooled on a cooling drum to obtain an unstretched film. The unstretched film was longitudinally stretched, transversely stretched and then heat-set so that the stretched film could have the property values as indicated in Table 1. Thus, biaxially stretched films having a thickness of 25 μm were provided.

The properties of the films and the results of their evaluation are shown in Tables 1 and 2.

EXAMPLE 4

Example 1 was repeated to provide a biaxially stretched film, except that the copolymerized component was changed from dimethyl isophthalate to dimethyl adipate and its amount was changed to that indicated in Table 1.

The properties of the film and the results of its evaluation are shown in Tables 1 and 2.

EXAMPLE 5

Example 1 was repeated to provide a biaxially stretched film, except that the ester-interchange catalyst was changed from 0.037 part of manganese acetate tetrahydrate to 0.018 part of tetrabutyl titanate.

The properties of the film and the results of its evaluation are shown in Tables 1 and 2.

COMPARATIVE EXAMPLE 3

Example 1 was repeated to provide a biaxially stretched film, except that the germanium dioxide as the polycondensation catalyst was changed to 0.06 part of antimony trioxide.

The properties of the film and the results of its evaluation are shown in Tables 1 and 2.

TABLE 1

| | Copolymer component | | Catalyst | | Melting point (°C.) | Glass transition temperature (°C.) | Intrinsic viscosity | Refractive index in thickness direction | Refractive index in plane direction | |
|---|---|---|---|---|---|---|---|---|---|---|
| | Compound | mol % | Ester-interchange | Polycondensation | | | | | max | min |
| Ex. 1 | Dimethyl isophthalate | 10 | Manganese acetate | Germanium dioxide | 231 | 73 | 0.63 | 1.525 | 1.635 | 1.625 |
| Ex. 2 | Dimethyl isophthalate | 10 | Manganese acetate | Germanium dioxide | 231 | 73 | 0.75 | 1.530 | 1.625 | 1.615 |
| Ex. 3 | Dimethyl isophthalate | 10 | Manganese acetate | Germanium dioxide | 231 | 73 | 0.55 | 1.529 | 1.640 | 1.620 |
| Comp. Ex. 1 | Dimethyl isophthalate | 10 | Manganese acetate | Germanium dioxide | 231 | 73 | 0.63 | 1.560 | 1.615 | 1.595 |
| Comp. Ex. 2 | Dimethyl isophthalate | 10 | Manganese acetate | Germanium dioxide | 231 | 73 | 0.63 | 1.515 | 1.670 | 1.605 |
| Ex. 4 | Dimethyl adipate | 10 | Manganese acetate | Germanium dioxide | 235 | 58 | 0.63 | 1.520 | 1.635 | 1.620 |
| Ex. 5 | Dimethyl isophthalate | 10 | Tetrabutyl titanate | Germanium dioxide | 231 | 73 | 0.63 | 1.515 | 1.625 | 1.615 |
| Comp. Ex. 3 | Dimethyl isophthalate | 10 | Manganese acetate | Antimony trioxide | 231 | 73 | 0.63 | 1.515 | 1.655 | 1.615 |

TABLE 2

|  | Deep drawing ability-(1) | Deep drawing ability-(2) | Resistance to crack by impact | Resistance to embrittlement under heat | Retort resistance | Rustproof property | Flavor retention |
| --- | --- | --- | --- | --- | --- | --- | --- |
| Ex. 1 | A | A | A | A | A | A | A |
| Ex. 2 | A | A | A | A | A | A | A |
| Ex. 3 | A | A | A | A | A | A | A |
| Comp. Ex. 1 | B | A | B | C | C | B | A |
| Comp. Ex. 2 | B | A | B | C | C | B | A |
| Ex. 4 | A | A | A | A | A | A | A-B |
| Ex. 5 | A | A | A | A | A | A | A |
| Comp. Ex. 3 | A | A | C | C | C | C | C |

EXAMPLES 6 TO 12 AND COMPARATIVE EXAMPLES 4 AND 5

Polyethylene terephthalates were obtained by copolymerizing the components as indicated in Table 3 under various polymerization conditions of the catalyst, reaction temperature and time.

Then, the copolyethylene terephthalates were dried, melted, extruded through a die and rapidly cooled on a cooling drum to provide unstretched films. The films were stretched in the longitudinal direction, and then transversely stretched under various temperatures and blow rates of hot air. Upon subsequent heat-setting, biaxially oriented films having a thickness of 25 μm were obtained.

The refractive indices in thickness direction is of those films were in a range from 1.510 to 1.540, and those in the plane direction were, in all directions, within the range from 1.620 to 1.650.

The results of evaluation of the films are shown in Table 3. All the films of the present invention exhibited excellent results.

sphere of the reaction system was reduced to vacuum, and the polycondensation reaction was conducted in a conventional manner to give a copolyethylene terephthalate.

Thus obtained copolyethylene terephthalate was melt-extruded through a die and rapidly cooled on a cooling drum to provide an unstretched film. The film was stretched longitudinally and then transversely, and heat-set to provide a 25 μm-thick biaxially stretched film.

The quality of the film and the results of its evaluation are shown in Tables 4 and 5.

EXAMPLES 14 AND 15, AND COMPARATIVE EXAMPLES 6 AND 7

Biaxially oriented films were obtained in the same manner as in Example 13 except that the amounts of dimethyl isophthalate, diethylene glycol and phosphoric acid and the film-forming conditions were varied for each run to render the film quality as indicated in Table 4.

The properties of the films and the results of their

TABLE 3

|  | Copolymer component | | Poly-condensation catalyst | Melting point (°C.) | Glass transition temperature (°C.) | Acetoaldehyde (ppm) | Carboxyl concentration | Deep drawing ability | Resistance to crack by impact | Retort resistance | Flavor retention |
| --- | --- | --- | --- | --- | --- | --- | --- | --- | --- | --- | --- |
|  | Compound | mol % | | | | | | | | | |
| Ex. 6 | Isophthalic acid | 12 | Germanium oxide | 228 | 74 | 4 | 45 | A | A | A | A |
| Ex. 7 | Isophthalic acid | 12 | Germanium oxide | 228 | 74 | 15 | 40 | A | A | A | A |
| Ex. 8 | Isophthalic acid | 6 | Germanium oxide | 242 | 74 | 10 | 60 | A | A | A | A |
| Ex. 9 | Isophthalic acid | 20 | Germanium oxide | 212 | 70 | 2 | 35 | A | A | A | A |
| Ex. 10 | Isophthalic acid | 12 | Antimony trioxide | 228 | 74 | 10 | 60 | A | A | A | B |
| Ex. 11 | Adipic acid | 9 | Germanium oxide | 238 | 60 | 5 | 35 | A | A | A | B |
| Ex. 12 | Diethylene glycol | 10 | Titanium tetrabutoxide | 235 | 67 | 18 | 40 | A | A | A | B |
| Comp. Ex. 4 | Isophthalic acid | 3 | Germanium oxide | 250 | 75 | 60 | 10 | C | C | C | D |
| Comp. Ex. 5 | Sebacic acid | 15 | Antimony trioxide | 226 | 48 | 20 | 30 | A | A | C | D |

EXAMPLE 13

Ninety (90) parts of dimethyl terephthalate, 10 parts of dimethyl isophthalate, 65 parts of ethylene glycol and 3 parts of diethylene glycol were charged in an autoclave. After further addition of 0.037 part of manganese acetate tetrahydrate, the ester-interchange reaction was conducted in a conventional manner. Subsequently 0.026 part of phosphoric acid and 0.027 part of germanium dioxide were added by the order stated. The atmoevaluation are shown in Tables 4 and 5.

EXAMPLE 16

A biaxially oriented film was obtained in the same manner as in Example 13 except that the manganese acetate tetrahydrate as the ester-interchange catalyst was changed to 0.018 part of tetrabutyl titanate.

The properties of the film and the results of its evaluation are shown in Tables 4 and 5.

COMPARATIVE EXAMPLE 8

A biaxially oriented film was obtained in the same manner as in Example 13 except that the germanium dioxide used as the polycondensation catalyst was changed to 0.06 part of antimony trioxide to render the film quality as indicated in Table 4.

The quality of thus obtained biaxially stretched film and the results of its evaluation are indicated in Tables 4 and 5.

EXAMPLE 17

Seventy-seven (77) parts of terephthalic acid, 9 parts of isophthalic acid and 40 parts of ethylene glycol were charged in an autoclave, and the esterification reaction was conducted under an elevated pressure. Subsequently, 0.007 part of trimethyl phosphate and 0.016 part of germanium dioxide were added to the reaction system, and the polycondensation was conducted under reduced pressure in a conventional manner.

The subsequent operations of forming the polyester into a film were carried out in the manner as described in Example 13. Thus a biaxially stretched film was obtained.

The quality of the film and results of its evaluation are shown in Tables 4 and 5.

TABLE 4

| | Isophthalic acid component (mol %) | Diethylene glycol component (mol %) | Catalyst Ester-interchange | Catalyst Polycondensation | Free phosphorus compound (mmol %) | Melting point (°C.) | Glass transition temperature (°C.) | Refractive index in thickness direction |
|---|---|---|---|---|---|---|---|---|
| Ex. 13 | 10 | 3.5 | Manganese acetate | Germanium dioxide | 20 | 224 | 71 | 1.525 |
| Ex. 14 | 12 | 0.5 | Manganese acetate | Germanium dioxide | 6 | 227 | 73 | 1.530 |
| Ex. 15 | 10 | 6.0 | Manganese acetate | Germanium dioxide | 56 | 218 | 69 | 1.540 |
| Comp. Ex. 6 | 10 | 3.5 | Manganese acetate | Germanium dioxide | 20 | 224 | 71 | 1.490 |
| Comp. Ex. 7 | 2 | 0.5 | Manganese acetate | Germanium dioxide | 0 | 251 | 75 | 1.505 |
| Ex. 16 | 10 | 4.0 | Tetrabutyl titanate | Germanium dioxide | 10 | 223 | 71 | 1.525 |
| Comp. Ex. 8 | 10 | 3.0 | Manganese acetate | Antimony trioxide | 20 | 225 | 72 | 1.525 |
| Ex. 17 | 10 | 2.5 | — | Germanium dioxide | 10 | 226 | 72 | 1.530 |

TABLE 5

| | Deep drawing ability-(1) | Deep drawing ability-(2) | Resistance to crack by impact | Resistance to embrittlement under heat | Retort resistance | Rustproof property | Flavor retention |
|---|---|---|---|---|---|---|---|
| Ex. 13 | A | A | A | A | A | A | A |
| Ex. 14 | A | A | A | A | A | A | A |
| Ex. 15 | A | A | A | A | A | A | A |
| Comp. Ex. 6 | C | C | C | B | B | B | A |
| Comp. Ex. 7 | B | B | C | C | C | B | A |
| Ex. 16 | A | A | A | A | A | A | A |
| Comp. Ex. 8 | A | A | A | A | B | B | C |
| Ex. 17 | A | A | A | A | A | A | A |

EXAMPLES 18 TO 25 AND COMPARATIVE EXAMPLE 8

Polyethylene terephthalates in which were copolymerized were prepared by copolymerizing each of the components indicated in Table 6 under various polymerization conditions, i.e., by varying the catalyst, reaction temperature and reaction time.

The resultant copolyethylene terephthalates were dried, melted and extruded through a die. The extrudates were rapidly cooled on a cooling drum and stretched in longitudinal and transverse directions each by 3 times to provide biaxially oriented films having a thickness of 25 μm.

The refractive indices in the thickness direction of the films were within a range from 1.510 to 1.540, and those in the plane direction were, in all directions, within a range from 1.620 to 1.650.

The results of evaluation of the films are indicated in Table 6. The films of the present invention exhibited excellent results.

TABLE 6

| | Copolymer component Compound | Copolymer component mol % | Polycondensation catalyst | Melting point (°C.) | Glass transition temperature (°C.) | Carboxyl concentration | Deep drawing ability | Resistance to crack by impact | Retort resistance | Flavor retention |
|---|---|---|---|---|---|---|---|---|---|---|
| Ex. 18 | Isophthalic acid | 12 | Germanium oxide | 228 | 74 | 50 | A | A | A | A |
| Ex. 19 | Isophthalic acid | 12 | Germanium oxide | 228 | 74 | 60 | A | A | A | A |

TABLE 6-continued

| | Copolymer component | | Polycondensation catalyst | Melting point (°C.) | Glass transition temperature (°C.) | Carboxyl concentration | Deep drawing ability | Resistance to crack by impact | Retort resistance | Flavor retention |
|---|---|---|---|---|---|---|---|---|---|---|
| | Compound | mol % | | | | | | | | |
| Ex. 20 | Isophthalic acid | 6 | Germanium oxide | 242 | 74 | 45 | A | A | A | A |
| Ex. 21 | Isophthalic acid | 18 | Germanium oxide | 216 | 71 | 50 | A | A | A | A |
| Ex. 22 | Isophthalic acid | 12 | Antimony trioxide | 228 | 74 | 40 | A | A | A | B |
| Ex. 23 | Adipic acid | 6 | Germanium oxide | 244 | 65 | 50 | A | A | A | A |
| Ex. 24 | Adipic acid | 9 | Antimony trioxide | 238 | 60 | 40 | A | A | A | B |
| Ex. 25 | Diethylene glycol | 10 | Titanium tetrabutoxide | 235 | 67 | 50 | A | A | A | A |
| Comp. Ex. 8 | Adipic acid | 15 | Germanium oxide | 226 | 48 | 30 | A | A | C | D |

What is claimed is:

1. A biaxially oriented polyester film which comprises an aromatic copolyester obtained with a germanium catalyst as the polycondensation catalyst, said copolyester having a melting point in the range of from 210° to 245° C. and a glass transition temperature not lower than 50° C.,
    wherein the biaxially oriented polyester film has a refractive index in the thickness direction in the range from 1.505 to 1.55 and a refractive index in the plane direction in the range from 1.61 to 1.66, and
    exhibits excellent shaping processability and deep drawing ability.

2. A biaxially oriented polyester film as defined in claim 1, in which the germanium catalyst is a germanium oxide.

3. A biaxially oriented polyester film as defined in claim 1, in which the aromatic copolyester has a melting point within a range of from 215° to 240° C.

4. A biaxially oriented polyester film as defined in claim 1, in which the aromatic copolyester has a glass transition temperature not lower than 60° C.

5. A biaxially oriented polyester film as defined in claim 1, in which the aromatic copolyester comprises ethylene terephthalate as the main recurring units and ethylene isophthalate as the subsidiary recurring units.

6. A biaxially oriented polyester film as defined in claim 1, in which the terminal carboxyl group concentration of the aromatic copolyester is 35 to 80 eq./$10^6$ g.

7. A biaxially oriented polyester film as defined in claim 1, in which the acetaldehyde content of the aromatic copolyester is not more than 20 ppm.

8. A biaxially oriented polyester film as defined in claim 1, in which the intrinsic viscosity of the aromatic copolyester is within a range from 0.52 to 0.8.

9. A biaxially oriented polyester film as defined in claim 1, in which the terminal methyl group concentration of the aromatic copolyester is not higher than 15 eq./$10^6$ g.

10. A biaxially oriented polyester film as defined in claim 1, in which the aromatic copolyester contains inert fine particles, said inert file particles having a particle diameter ratio of the longer diameter/shorter diameter in a range from 1.0 to 1.2.

11. A biaxially oriented polyester film as defined in claim 10, in which the inert fine particles have an average particle diameter of not more than 2.5 μm.

12. A biaxially oriented polyester film as defined in claim 1, in which the aromatic copolyester is prepared by an ester-interchange method using a titanium compound as the ester-interchange catalyst.

13. A biaxially oriented polyester film as defined in claim 12, in which the titanium compound is a reaction product of alkyl titanate and/or a condensation product thereof with an organic carboxylic acid and/or an anhydride thereof.

14. A biaxially oriented polyester film as defined in claim 1, in which the refractive index in the thickness direction is within a range from 1.51 to 1.54.

15. A biaxially oriented polyester film as defined in claim 1, in which the refractive index in the plane direction is within a range from 1.615 to 1.655.

16. A biaxially oriented polyester film as defined in claim 1, of which Differential Scanning Calorimeter (Dsc) chart has an endothermic peak other than the melting point, in the range of from 150° to 205° C.

17. A biaxially oriented polyester film as defined in claim 1, which contains fine projections on the film surface, said projections satisfying the following equation:

$$0.1 \leq Nd/N \leq 0.5$$

wherein N is the number of fine projections per the unit area of the film surface, and Nd is the number of such projections that have depressions therearound, among said N.

18. A biaxially oriented polyester film as defined in claim 1, which, heated in n-heptane for 2 hours at 66° C., gives no more than 0.5 mg/inch$^2$ of an extract.

19. A biaxially oriented polyester film as defined in claim 1, laminated onto a metal sheet and having deep drawing ability-(2) of not higher than 0.1 mA.

20. A biaxially oriented polyester film as defined in claim 1, wherein the biaxially oriented polyester film has a germanium content of 40 to 200 ppm based on the germanium atom remaining in the aromatic copolyester.

21. A biaxially oriented polyester film which comprises an aromatic copolyester obtained with a germanium catalyst as the polycondensation catalyst, said copolyester having a melting point in the range from 215° to 240° C. and a glass transition temperature not lower than 50° C.,
    wherein the biaxially oriented polyester film has a refractive index in the thickness direction in the range from 1.505 to 1.55 and a refractive index in the plane direction in the range from 1.61 to 1.66, has a germanium content of 40 to 200 ppm based on the germanium atom remaining in the aromatic copolyester, and has a terminal carboxyl group concentration of 35 to 80 eq/$10^6$ g., and exhibits excellent shaping processability and deep drawing ability.

22. A biaxially oriented polyester film as defined in claim 21, in which the germanium catalyst is a germanium oxide catalyst.

23. A biaxially oriented polyester film as defined in claim 21, in which the aromatic copolyester has a glass transition temperature not lower than 60° C.

24. A biaxially oriented polyester film as defined in claim 21, in which the aromatic copolyester has an acetaldehyde content of not more than 20 ppm.

25. A biaxially oriented polyester film as defined in claim 21, in which the intrinsic viscosity of the aromatic copolyester is within a range of from 0.52 to 0.8.

26. A biaxially oriented polyester film which comprises an aromatic copolyester obtained with a germanium catalyst as the polycondensation catalyst, said copolyester having a melting point in the range from 215° to 240° C. and a glass transition temperature not lower than 50° C., wherein the biaxially oriented polyester film has a refractive index in the thickness direction in the range from 1.505 to 1.55 and a refractive index in the plane direction in the range from 1.61 to 1.66, has a germanium content of 60 to 150 ppm based on the germanium atom remaining in the aromatic copolyester, has an acetaldehyde content of less than 20 ppm, and has a terminal carboxyl group concentration of 35 to 80 eq/$10^6$ g, and exhibits excellent shaping processability and deep drawing ability.

27. A biaxially oriented polyester film as defined in claim 26, in which the germanium catalyst is a germanium oxide catalyst.

28. A biaxially oriented polyester film as defined in claim 26, in which the aromatic copolyester has a glass transition temperature not lower than 60° C. and in which the intrinsic viscosity of the aromatic copolyester is within a range of from 0.52 to 0.8.

* * * * *